(12) United States Patent
Ferrar

(10) Patent No.: US 10,156,298 B2
(45) Date of Patent: *Dec. 18, 2018

(54) VEHICLE MOUNTABLE ARM FOR VALVE OPERATING MACHINE

(71) Applicant: Illinois Tool Works Inc., Glenview, IL (US)

(72) Inventor: Scott Ferrar, Hoffman Estates, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,231

(22) Filed: May 20, 2015

(65) Prior Publication Data

US 2015/0323096 A1 Nov. 12, 2015

Related U.S. Application Data

(63) Continuation of application No. 13/607,423, filed on Sep. 7, 2012, now Pat. No. 9,038,667, which is a continuation of application No. 13/212,499, filed on Aug. 18, 2011, now Pat. No. 8,387,664, which is a continuation of application No. 12/111,423, filed on Apr. 29, 2008, now Pat. No. 8,025,078.

(51) Int. Cl.
*F16K 31/46* (2006.01)
*B25B 21/00* (2006.01)
*B25J 5/00* (2006.01)
*B25J 19/00* (2006.01)

(52) U.S. Cl.
CPC ............ *F16K 31/46* (2013.01); *B25B 21/002* (2013.01); *B25J 5/007* (2013.01); *B25J 19/0004* (2013.01); *F15B 2211/3127* (2013.01); *F15B 2211/40515* (2013.01); *F15B 2211/426* (2013.01); *F15B 2211/455* (2013.01); *F15B 2211/7058* (2013.01); *Y10T 137/6855* (2015.04)

(58) Field of Classification Search
CPC . F16K 31/12; F16K 31/46; E03B 9/00; E03B 9/08; B25B 13/48; B25B 21/002; Y10T 137/6855
USPC .............................. 248/647, 282.1; 188/170
See application file for complete search history.

(56) References Cited

U.S. PATENT DOCUMENTS

| | | |
|---|---|---|
| 1,979,340 A | 11/1934 | Norman |
| 3,481,229 A | 12/1969 | Dickmann et al. |
| 3,847,039 A | 11/1974 | Azuma |
| 3,977,636 A | 8/1976 | Bumueller |

(Continued)

OTHER PUBLICATIONS

Vermeer Manufacturing Company; FM350 FlowMASTER Series (product literature); 1210 Vermeer Road East; P.O. Box 200; Pella, IA; 50219.

(Continued)

*Primary Examiner* — Kevin Murphy
(74) *Attorney, Agent, or Firm* — Klintworth & Rozenblat IP LLP

(57) ABSTRACT

A valve operating device includes a mounting for attachment to a vehicle and an elongate arm, the free end of which is only moveable across the underlying ground. The joints of the arm pivot around vertical axes and the arm is locked into a desired orientation by a brake at each joint. A valve turning machine is at the free end of the arm. The brakes are engaged and released by a control on the valve turning machine.

51 Claims, 6 Drawing Sheets

(56) References Cited

U.S. PATENT DOCUMENTS

| | | | |
|---|---|---|---|
| 4,828,033 A | 5/1989 | Frison | |
| 5,018,929 A | 5/1991 | Carson | |
| 5,101,862 A * | 4/1992 | Leete | F15B 15/12 |
| | | | 137/486 |
| 5,558,169 A | 9/1996 | Madgwick et al. | |
| 5,570,581 A | 11/1996 | Preston | |
| 5,570,975 A | 11/1996 | Reinert, Sr. | |
| 5,662,176 A | 9/1997 | Madgwick | |
| 5,810,051 A | 9/1998 | Campagna | |
| 6,009,905 A | 1/2000 | Arnemann | |
| 6,471,165 B2 | 10/2002 | Twisselmann | |
| 6,945,336 B1 | 9/2005 | Darling et al. | |
| 7,004,262 B1 | 2/2006 | Voichoskie | |
| 7,111,817 B2 | 9/2006 | Teti et al. | |
| 7,311,452 B2 | 12/2007 | Chapman | |
| 7,334,606 B1 | 2/2008 | Hurley | |
| 8,025,078 B2 * | 9/2011 | Ferrar | B25J 5/007 |
| | | | 137/899 |
| 8,387,664 B2 * | 3/2013 | Ferrar | B25J 5/007 |
| | | | 137/899 |
| 9,038,667 B2 * | 5/2015 | Ferrar | B25J 5/007 |
| | | | 137/899 |
| 9,523,443 B2 * | 12/2016 | Ferrar | B25J 5/007 |
| 2004/0134674 A1 | 7/2004 | Skorez | |
| 2005/0193451 A1 | 9/2005 | Quistgaard | |
| 2007/0007418 A1 * | 1/2007 | Lubbers | F16D 63/008 |
| | | | 248/326 |
| 2007/0067911 A1 | 3/2007 | Graham et al. | |
| 2008/0196790 A1 | 8/2008 | Fargeot | |

OTHER PUBLICATIONS

Advancedmanipulator.com; www.advancedmanipulator.com/images/torque_arm/horton.jpg; www.advancedmanipulator.com/images/torque_am/gehl.jpg; www.advancedmanipulator.com/images/torque_am/horton.jpg.

* cited by examiner

VEHICLE MOUNTABLE ARM FOR VALVE OPERATING MACHINE

The present application is a continuation of U.S. patent application Ser. No. 13/607,423, filed Sep. 7, 2012, which is a continuation of U.S. patent application Ser. No. 13/212,499, filed Aug. 18, 2011, now U.S. Pat. No. 8,387,664, issued Mar. 5, 2013, which is a continuation of U.S. patent application Ser. No. 12/111,423, filed Apr. 29, 2008, now U.S. Pat. No. 8,025,078, issued Sep. 27, 2011, the contents of all of which are incorporated herein by reference in their entirety. The present invention relates to valve operating machines and in particular to an adjustable arm attachable to a vehicle for supporting a valve operating machine while it is exercising a valve.

BACKGROUND OF THE INVENTION

Municipalities and the like have extensive networks of piping to control the flow of water from storage and pumping stations to users. The network of piping includes numerous valves such that portions of the network can be closed off as needed for service while the remainder of the network remains in operation. The piping required for such networks can range in size from as small as three or four inches in diameter to as large as three feet in diameter. Also, the valves of the system typically remain in an open condition or in a closed condition for very long periods of time. The valves of a municipal water system are located below ground with an access shaft extending from the valve stem to the surface through which an elongate key is extended to turn the stem. Such valves typically include a screw that is rotatable through one hundred turns or more to fully open or fully close the valve. Also, underground valves undergo a certain degree of deterioration over time and it is common for valves to become frozen or locked into their current position as a result of contamination on the surface of the screw or deterioration of the parts. As a result, the large amount of torque needed to open and close such valves is provided by a motorized valve operating machine. Such machines are heavy and awkward and when operated apply a great amount of torque to the key that extends down a shaft to the valve stem for rotating the valve. Accordingly, to aid in the operation of such valve turning machines it is common to mount such valve turning machines on an arm attached to a truck.

One such mounting device shown in U.S. Pat. No. 6,009,905 to Arnemann is to mount the valve turning machine on a horizontal slide that allows the machine to move horizontally from a first position over the truck bed to a second position spaced from the side of the truck. Such slideable mounting provides rigid support to the valve turning machine while it exercises a valve.

The longitudinally slideable structure, however, has limited mobility with respect to the vehicle. Where valves are positioned between various obstacles such as buildings, curbs, boulders, trees and the like, it may not be possible for the truck to reach a position where the valve operating machine may be positioned directly over the shaft leading to the valve.

Efforts have been made to attach a valve operating machine to a manipulating arm connected to a truck. One such device is sold under the trademark SPIN DOCTOR by Hurco Technologies, Inc. and disclosed in Hurley, U.S. Pat. No. 7,334,606 B1. The Hurley device includes a multi-hinged arm configured as a backhoe with the inner end of the arm connected to a vehicle and the outer end to a valve turning machine. The arm is pivotable about a horizontal axis generally giving the device a hundred and eighty degree range of rotation with the hinged elbow of the backhoe arm permitting the free end of the arm to move eight to twelve feet radially outward of the vehicle. The hinged elbow includes one or more spring loaded compensating structures to apply a vertically upward force to the free end of the arm to compensate for the weight of the valve turning machine. By virtue of the spring loaded compensating devices, the free end of the arm can be manipulated to a position directly over an otherwise difficult to reach shaft to a valve.

It has been found that a valve turning machine mounted on the Hurco arm is attached by a key to a valve and with torque applied to the key by the machine, the machine will shake and toss violently as the valve is exercised. The shaking and tossing is a result of the uneven torque applied to the key as the turning screw encounters areas of contamination by foreign materials and deterioration of the moving parts. The shaking and tossing of the machine includes vertical components of force which cause the key to be pulled free of the valve stem thereby interrupting the valve turning operation and perhaps causing damage to either the machine or the valve. To retain the machine and the key in their desired orientation with respect to the valve stem, the operator is required to grasp the machine with his arms and use his body weight to hold the machine in the desired orientation as the valve is exercised. Since the shaking and tossing of the machine is caused by contamination and deterioration below ground and not visible to the operator, the movement of the machine is unpredictable and can also cause injury to the operator. Accordingly, there is a need for providing an extendible arm for supporting a valve operating machine over a valve stem positioned remotely from a vehicle that will retain the machine against all the forces applied to the end of the arm as a consequence of frequent and sudden changes in torque applied to the valve.

SUMMARY OF THE INVENTION

Briefly, the present invention is embodied in a valve operating device that has a mounting attachable to a vehicle and an arm having a first end pivotally attached to the mounting and a valve operating machine rigidly attached to the second end of the arm. The pivot at the first end of the arm permits rotation of the arm only about a vertical axis such that the free end of the arm is moveable through a plane parallel to the underlying ground below the vehicle to which the mounting is attached. The arm is made with sufficient strength and rigidity that the free end will provide support to the valve operating machine at the second end against the vertical forces applied by gravity and resulting from torque applied by the valve operating machine to turn a valve stem.

The arm includes a lock for selectively locking and unlocking the pivot between the mounting member and the first end of the arm. In the preferred embodiment, the lock is in the form of a hydraulically operating disc brake. The lock includes a control for selectively engaging and disengaging the lock, and the control is operated from a location at the second end of the arm. Accordingly, an operator can use his hand to grasp a handle at the second end of the arm and use the thumb of that hand to operate the control to disengage the lock. The operator can then manually manipulate the second end of the arm until the valve operating machine is over a shaft leading to a valve stem. Once the machine is properly positioned, the operator can release the thumb operated control to engage the lock thereby retaining the arm in a rigid position over the shaft to the valve.

In another embodiment of the device, a second arm is provided between the second end of the first arm and the valve operating machine. In this embodiment, a second pivot is provided between the second end of the first arm and the first end of the second arm with the second pivot also rotatable only about a vertical axis such that the free end of the second arm is also moveable through a plane parallel to the underlying ground. The second arm is also made with sufficient strength and rigidity such that the second end of the second arm will retain the valve turning machine against the forces of gravity and the forces generated from the machine when it applies torque to the valve stem.

BRIEF DESCRIPTION OF THE DRAWINGS

A better and more complete understanding of the invention will be had after a reading of the following detailed description taken in conjunction with the drawings wherein:

FIG. 5A is an elevational view of an electronic controller; and

DETAILED DESCRIPTION OF PREFERRED EMBODIMENT

Figure 1:
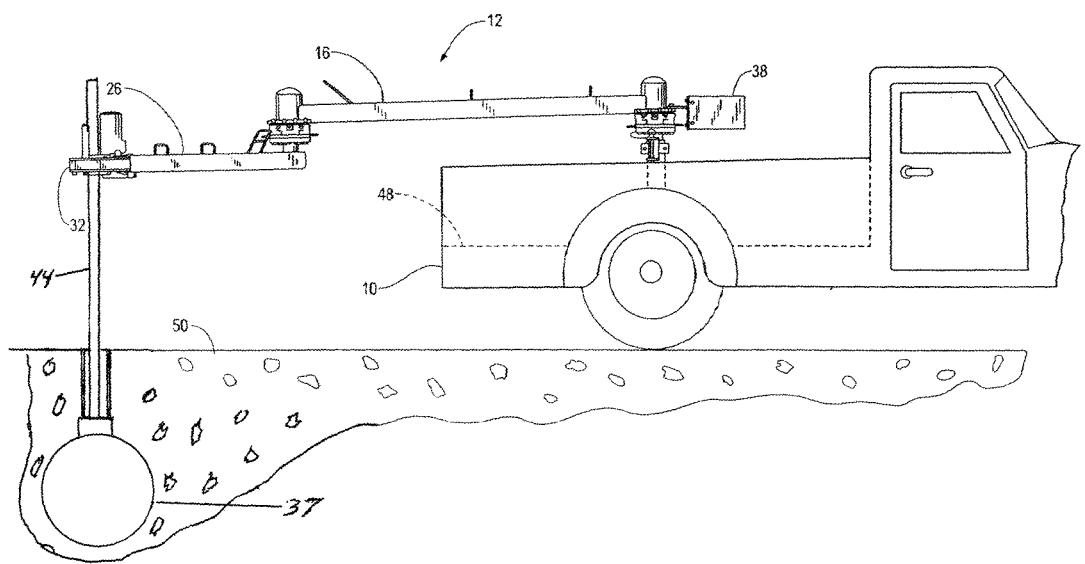
FIG. 1 is a side elevational view of a valve turning machine mounted on a vehicle in accordance with the present invention.
Figure 2:
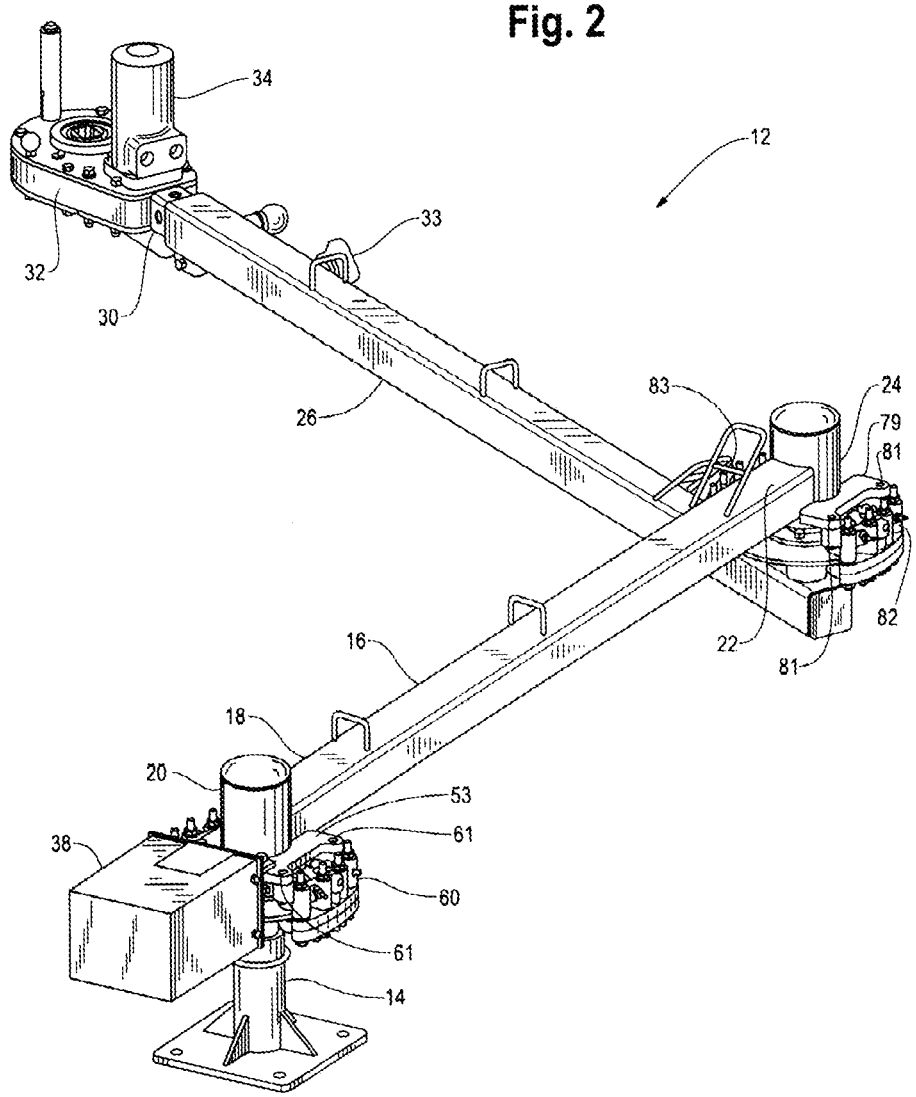
FIG. 2 is an enlarged isometric view of the arm and valve operating machine mounted on the truck shown in FIG. 1.
Figure 3:
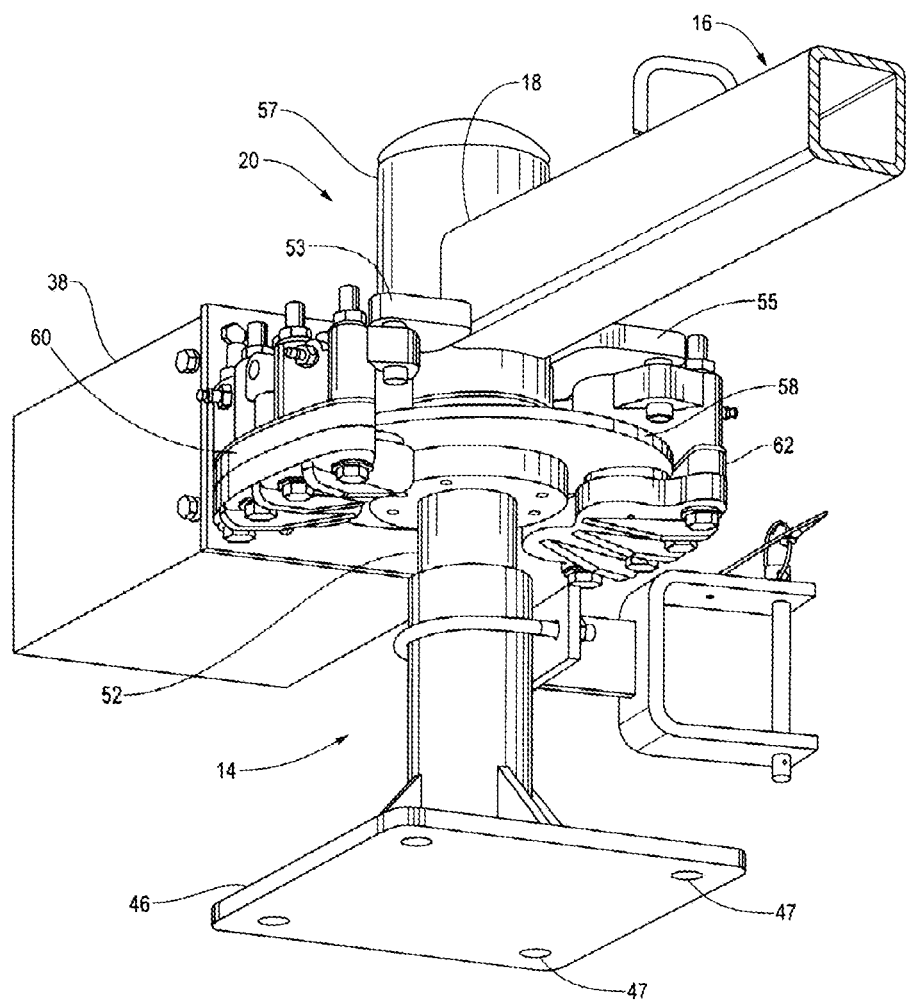
FIG. 3 is a further enlarged fragmentary isomeric view of the arm shown in FIG. 2 depicting the arm mounting and the first pivot thereof.
Figure 4:
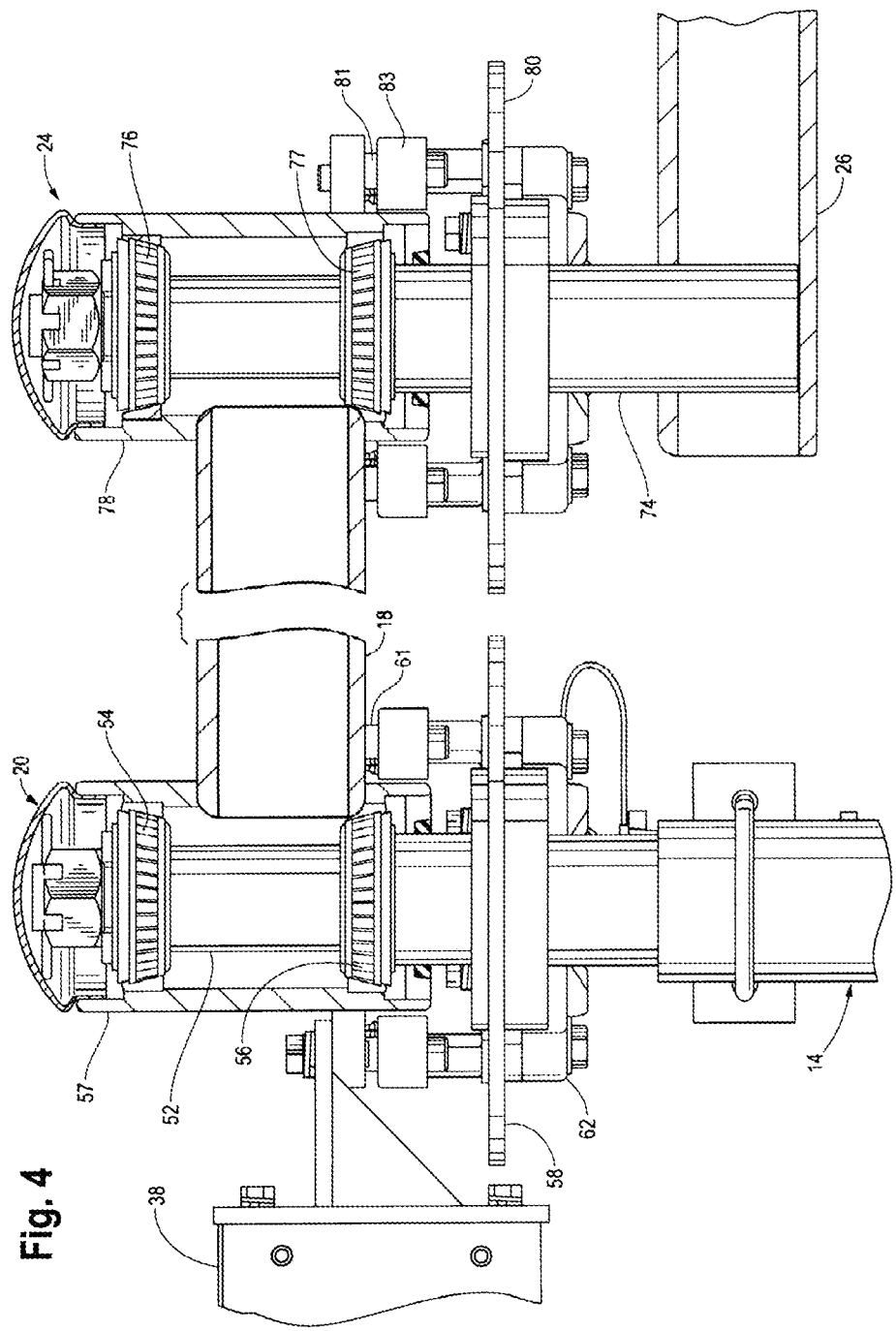
FIG. 4 is a fragmentary cross-sectional view of the arm shown in FIG. 2 showing the inner parts of the two pivots.

Referring to FIGS. 1, 2, 5, and 6, a vehicle 10 is fitted with an elongate valve operating device 12. The valve operating device 12 has a mounting portion 14 and an arm. The arm consists of a first arm portion 16 having a first end 18 pivotally attached to the mounting portion 14 by a first pivot 20 and a second end 22 attached by a second pivot 24 to a first end of the first section 26 of a second arm portion. The second arm is telescopically extendible and therefore the first section 26 thereof is a generally hollow tubular member with a rectangular cross-section, the first end of which is attached to the second pivot 24 and the second end of which telescopically receives the first end of a second section 30. The second section 30 has a generally rectangular cross-section with outer dimensions a little smaller than the inner dimensions of the first section 26 such that the second section 30 will not rotate axially with respect to the first section 26. Rigidly attached to the distal end of the second section 30 is a valve turning machine 32. An adjustable screw 33 with an enlarged head 35 in the shape of a handle is threaded into a complementarily threaded hole, not numbered, in the wall of the first end section 26 and against the surface of the second section 30. When the screw 33 is tightened against the second section 30, the first and second sections 26, 30 are longitudinally locked to one another and when the screw 33 is loosened, the second section 30 is longitudinally moveable with respect to the first section 26.

The valve turning machine 32 includes a hydraulic motor 34 and an electronic controller 36 which may be detachable from the body of the machine 32 but communicate with the machine either through a wire, not shown, or by wireless technology. The controller 36 includes a microprocessor having a memory for storing information about the valve 37 to be controlled such as the rotational direction for opening the valve 37, the number of turns to move the valve from fully closed to fully open position, the maximum torque that can be applied to the stem, the current position, open or closed, of the valve, and the date on which it was last exercised. Using information in the memory plus input from an operator, the controller operates a sequence of valves 33, 35 in a manifold 38 to direct hydraulic fluid from a pump 40 (shown only schematically in FIG. 6) through a plurality of hoses 41, 43 (also shown only in FIG. 6) to operate the motor 34 in either a clockwise or counterclockwise direction. The motor 34 drives a rectangular sleeve 42 on the machine 32 into which is inserted an elongate key 44, the lower end of which fits over a polygon shaped stem, not shown, of a valve for rotating the valve. The valve turning machine 32 is the type known in the art and such a machine is described in further detail in U.S. Pat. No. 5,381,996, which is incorporated herein by reference.

Referring to FIGS. 2, 3, 4, and 6, the mounting portion 14 includes a mounting plate 46 with a plurality of mounting holes 47 therein for attachment to a stable part of a vehicle 10, such as the truck bed 48, which remains generally parallel to the level of the underlying ground 50. The mounting portion 14 also includes a pedestal 52 extending vertically from the mounting plate 46, the upper end of which defines a vertical axis around which the first pivot 20 rotates. The first pivot 20 includes a pair of bearings 54, 56, the inner races of which are fitted tightly around the upper end of the pedestal 46 and the outer races of which are rigidly retained in tubular mounting cup 57 at the first end 18 of the first arm. The second end of the first arm portion 16 will therefore rotate through a plane that is perpendicular to the pedestal 52 and parallel to the bed 48 of the vehicle 10 and parallel to the underlying ground 50.

Positioned below the bearing assemblies 54, 56 and surrounding a central portion of the pedestal 52 is a generally planar horizontal first brake disc 58. Attached to the first end 18 of the first arm portion 16 by a pair of brackets 53, 55, each of which has a pair of downwardly extending slide pins 61-61 attached thereto, is a first pair of hydraulically operated brake calipers 60, 62 that float with respect to the brake disc 58 on slide pins 61-61. Each of the brake calipers 60, 62 includes first and second parallel operated pistons, 66, 67, 68, 69, moveable within piston housings, portions of two of which, numbered 63, 64, are visible in FIG. 3. The pistons are connected by rods, not visible, to a pair of upper pads, also not visible, that rest on the upper surface of the brake disc 58. The calipers 60, 62 also support a pair of lower pads positioned against the lower surface of brake disc 58. Portions of two of the lower pads, numbered 70, 72 can be seen in FIG. 3. Upon operation of the calipers 60, 62, the pistons 66-69 in the housing 63, 64 are extended thereby pressing the upper pads against the upper surface of the brake disc 58 and simultaneously drawing the lower pads 70, 72 against the lower surface thereof to lock the first arm portion 16 in a fixed orientation with respect to the mounting portion 14 and the vehicle 10.

Extending vertically upward from the first end 26 of the second arm portion 26, 30 and perpendicular to the length of the second arm portion 26, 30 is a second pedestal 74, the upper end of which serves as the axis of rotation for the second pivot 24. The inner races of a second pair of bearings 76, 77 is fitted around the second pedestal 74 and the outer race is received within a tubular mounting cup 78 welded to the second end 22 of the first arm portion 16. The mounting cup 78 retains the axis of rotation of the second bearing 76, 77 around the second pedestal 74 parallel to the axis of rotation of the first set of bearings 54, 56 around the first pedestal 52. Accordingly, the second arm portion 26, 30 will rotate about an axis defined by the second pedestal 74 with the length thereof parallel to the bed 48 such that with the outer end thereof moving in a plane parallel to the bed 48 of the vehicle 10 and parallel to the underlying ground 50. It should be appreciated that the distal end of the second end always moves within the same plane regardless of whether the movement occurs as a result of rotation of the first pivot 20, the second pivot 24, or the longitudinal extension or retraction of the second arm portion 26, 30 by telescopically sliding the outer portion 30 into or out of the first portion 26. Fitted around the circumference of the second pedestal 74 is a second brake disc 80 and attached to the first end of the second arm portion 26 is a second pair of calipers 82.

Extending downwardly from a second pair of brackets welded to the second end 22 of the first arm portion 16 (one bracket 79 is visible in FIG. 2) are a pair of slide pins 81-81. Slideably mounted on each pair of slide pins 81-81, so as to float above the brake disc 80, is a second pair of calipers 82, 83. The second pair of calipers 82, 83 are structurally identical to the first pair of calipers 60, 62 and each encloses a pair of pistons 84, 85, 86, 87 with each piston connected by a rod to an upper pad positioned against the upper surface of the second disc brake 80. The second calipers 82, 83 also include first and second lower pads positioned to be compressed against the lower surface of the second brake disc 80, one opposite each of the upper pads. Upon actuation of the second pair of calipers 82, 83 the pistons 84-87 will compress the upper pads against the upper surface of the disc brake 80 and draw the lower pads against the lower surface thereby locking the second arm portion 26, 30 in a fixed orientation with respect to the first arm portion 16.

The two sets of bearings 54, 56 and 76, 77 ensure that the distal end of the second arm portion 30 is only moveable within a plane parallel to the underlying ground 50, and allow the arm to be manipulated by an operator using only one hand while the two brake assemblies 58, 80 are disengaged.

Figure 5:
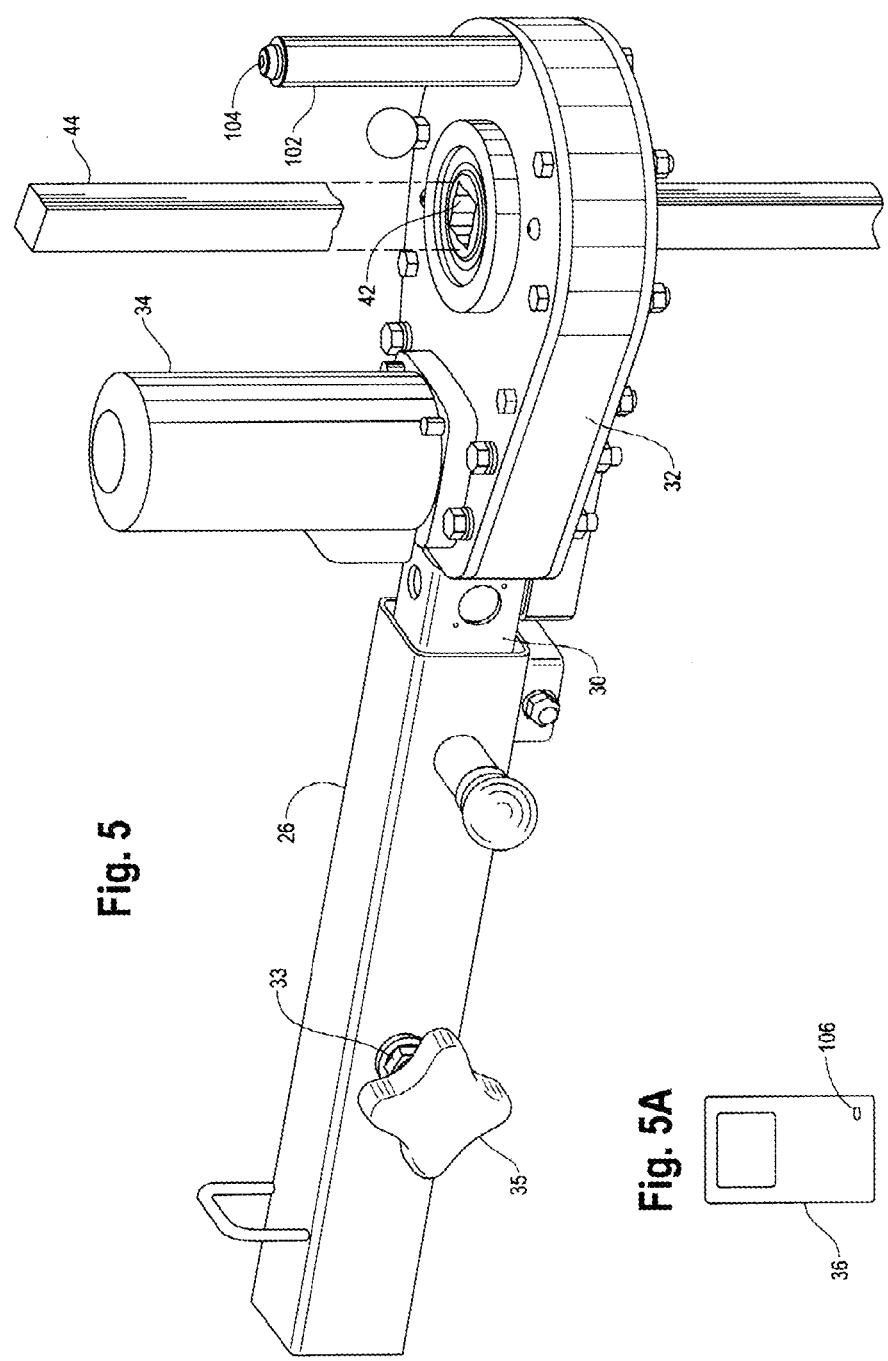
FIG. 5 is an isometric view of the second end of the second arm showing the valve operating machine and its controls.
Figure 6:
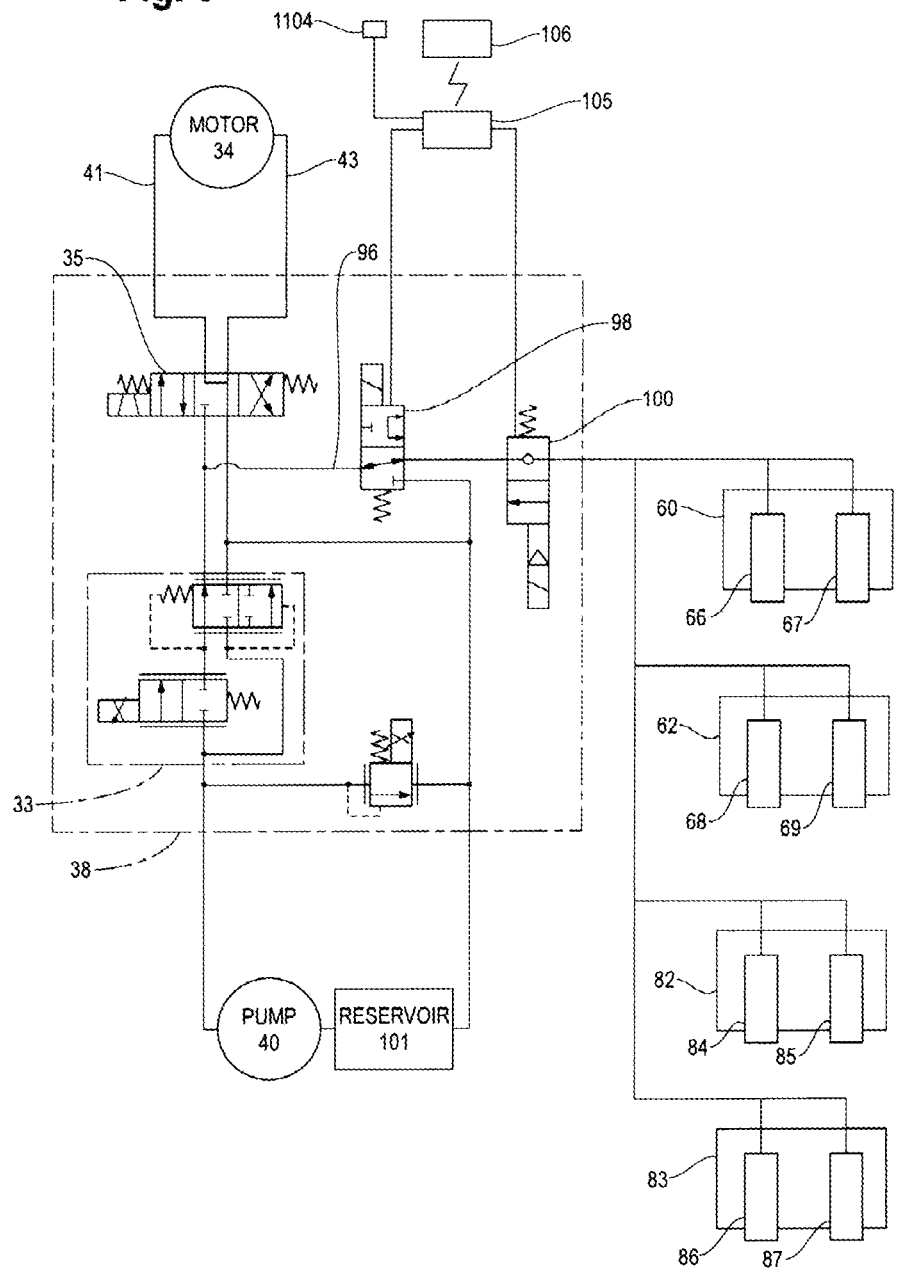
FIG. 6 is a schematic drawing of the hydraulics for operating the arm shown in FIG. 2.

Referring to FIGS. 5 and 6, the pistons 66-69, 84-87 of the first and second pairs of calipers 60, 61, 82, 83 are all hydraulically operated by the application of hydraulic fluid from the pump 40 through a hydraulic supply line 96 connected to a control valve 98. A release valve 100 retains or releases hydraulic pressure from the pistons. When the control valve 98 is opened, hydraulic pressure generated by the pump 40 will actuate the pistons 66-69, 84-87 in both calipers 60, 82 thereby locking the first arm 16 in a fixed orientation with the vehicle 10 and the underlying ground 50 and locking the second arm portion 26, 30 in a fixed orientation with respect to the first arm portion 16. When the pressure is released by the release valve 100, the pads of the calipers 60, 61, 82, 83 will relax and the first arm portion 16 will be free to rotate about the first pedestal 52 and the second arm portion will be free to rotate about the second pedestal 74.

An important feature of the invention is the provision of a handle 102 positioned at the outer end of the valve turning machine 32 where it is easily grasped by an operator. At the distal end of the handle 102 is a control button 104 for a valve control 105. When the button 104 on the handle 102 is depressed, the valve control 105 operates the valve 98 and the release valve 100 to release hydraulic pressure from the two sets of calipers 68, 82 thereby releasing the brakes. Conversely, when the button 104 is not depressed, the control valve 98 and release valve 100 are configured to apply hydraulic pressure to the calipers 60, 61, 82, 83 to thereby lock the first and second arm portions 16, 26 in their desired orientation.

Although the control button 104 is described as being at the end of the handle 102, it should be appreciated that the intent is to have the actuation device located where it is convenient to the operator as he manipulates the arms 16, 26, 30. It is therefore within the spirit of the invention to provide an actuator 106 for operating the control 105 on the electronic control 36. The device 106 may be in addition to the button 104 on the handle 102, or in substitution therefore.

Another important feature of the invention is that the mounting portion 14, the first and second arm portion 16, 26, and the first and second pivots 20, 24 are all made with sufficient strength and rigidity to hold the valve turning machine 32 within a plane of movement defined by the second arm portion 26. Specifically, the elongate parts are made sufficiently strong and the bearings of the pivots are sufficiently large and rigid enough to hold the valve turning machine 32 at a fixed elevation in opposition to the forces of gravity applied by virtue of the weight of the valve operating machine 32 and in opposition to the vertical forces incurred as the machine 32 applies torque to a valve stem. Accordingly, an operator will not be required to use his own body to retain the machine 32 against the forces that shake and throw the machine when torque is applied to a valve.

An operator using a truck 10 fitted with a valve operating device 12 in accordance with the present invention, will drive the vehicle 10 to a position near an underlying valve 37. Once the vehicle 10 is properly positioned, the operator can grasp the handle 102 with one hand, compress the button 104 with the thumb of that hand, and using the same hand manipulate the distal end of the second arm portion 26 until it is positioned immediately above the valve 37 to be exercised.

When the arm is properly positioned above a valve stem, the operator can release his grip on the button 104 thereby causing the control valve 98 and release valve 100 to allow hydraulic pressure to be applied to the calipers 60, 61, 82, 83 and lock the first and second arm portions 16, 26, 30 in their present orientation. With the arms so locked, the operator can position the key 44 in the sleeve 42 of the valve turning machine 32 with distal end thereof fitted over the stem of the valve. Once the key 44 is attached to the valve the operator can then use the hand held electronic controller 36 to operate the valve turning machine 32 to exercise the underlying valve without requiring the operator to touch the machine 32 while it is operating. The operator, therefore, does not have to use his body weight to retain the machine 32 against the forces generated as torque is applied to the valve as is the case with machines mounted on prior art manipulating arms.

After the valve has been fully exercised, the operator can remove the key 44 from the valve stem and the sleeve 42 thereby disconnecting the valve operating machine from the valve. The operator can then again grasp the handle 102 and depress the button 104 causing the control valve 98 and release valve 100 to release hydraulic pressure to the calipers 60, 82 and allow the operator to easily manipulate the arm 12 and fold it against the side of the vehicle 10 for transporting to another site.

While the present invention has been described with respect to a single embodiment, it will be appreciated that many modifications and variations may be made without departing from the spirit and scope of the invention. It is therefore the intent of the appended claims to cover all such modifications and variations that fall within the spirit and scope of the invention.

What is claimed:

1. A valve operating device comprising:
 a mounting;
 a first pedestal extending vertically from the mounting, wherein the first pedestal defines a first vertical pivot axis;
 a first arm having a first end and a second end, wherein the first arm is pivotally coupled to the first pedestal at the first end of the first arm, and wherein the first arm is configured to rotate about the first vertical pivot axis and is generally perpendicular to the first vertical pivot axis;
 a first bearing coupled to the first pedestal and the first end of the first arm to facilitate pivoting of the first arm relative to the mounting;
 a first brake positioned at the first pedestal and coupled to the first end of the first arm to selectively prevent rotation of the first arm relative to the mounting;
 a second pedestal defining a second vertical pivot axis and positioned at the second end of the first arm, wherein the first vertical pivot axis and the second vertical pivot axis are substantially parallel;
 a second arm having a first end and a second end, wherein the second arm is pivotally coupled to the second pedestal at the first end of the second arm, and wherein the second arm is configured to rotate about the second vertical axis;
 a second bearing coupled to the second pedestal and the first end of the second arm to facilitate pivoting of the second arm relative to the first arm;
 a second brake positioned at the second pedestal and coupled to the first end of the second arm to selectively prevent rotation of the second arm relative to the first arm; and
 a valve turning machine coupled to the second end of the second arm, wherein the valve turning machine includes a motor and a handle;
 wherein the first bearing includes an inner race and an outer race, wherein the inner race is tightly fitted around the first pedestal and the outer race is rigidly retained at the first end of the first arm.

2. The valve operating device of claim 1, wherein the first arm and the second arm are hollow and tubular along at least a portion thereof.

3. The valve operating device of claim 2, wherein the first arm and the second arm are rectangular in cross-section.

4. The valve operating device of claim 1, wherein the motor of the valve turning machine is a hydraulic motor.

5. The valve operating device of claim 1, further comprising an electronic controller detachable from the valve turning machine and in communication with the valve turning machine.

6. The valve operating device of claim 5, wherein the electronic controller is in communication with the valve turning machine through a wire.

7. The valve operating device of claim 5, wherein the electronic controller is in wireless communication with the valve turning machine.

8. The valve operating device of claim 5, wherein the electronic controller includes a microprocessor and memory, wherein the memory is configured to store information pertaining to operation of the valve operating device.

9. The valve operating device of claim 1, further comprising a hydraulic pump, a manifold, and at least one valve in the manifold to direct hydraulic fluid from the pump through at least one hose to operate the motor.

10. The valve operating device of claim 1, wherein the handle is positioned at an outer end of the valve turning machine.

11. The valve operating device of claim 1, wherein the second bearing includes an inner race and an outer race, wherein the inner race of the second bearing is tightly fitted around the second pedestal and the outer race is rigidly retained near the second end of the first arm.

12. The valve operating device of claim 1, wherein the mounting includes a mounting plate.

13. The valve operating device of claim 1, wherein the valve turning machine further includes a control configured to operate at least one of the first brake and the second brake.

14. The valve operating device of claim 13, wherein the handle and the control are remote from the first and second brakes.

15. A valve operating device comprising:
 a mounting;
 a first pedestal extending vertically from the mounting, wherein the first pedestal defines a first vertical pivot axis;
 a first arm having a first end and a second end, wherein the first arm is pivotally coupled to the first pedestal at the first end of the first arm, and wherein the first arm is configured to rotate about the first vertical pivot axis and is generally perpendicular to the first vertical pivot axis;
 a first bearing coupled to the first pedestal and the first end of the first arm to facilitate pivoting of the first arm relative to the mounting;
 a first brake positioned at the first pedestal and coupled to the first end of the first arm to selectively prevent rotation of the first arm relative to the mounting;
 a second pedestal defining a second vertical pivot axis and positioned at the second end of the first arm, wherein the first vertical pivot axis and the second vertical pivot axis are substantially parallel;
 a second arm having a first end and a second end, wherein the second arm is pivotally coupled to the second pedestal at the first end of the second arm, and wherein the second arm is configured to rotate about the second vertical axis;
 a second bearing coupled to the second pedestal and the first end of the second arm to facilitate pivoting of the second arm relative to the first arm;
 a second brake positioned at the second pedestal and coupled to the first end of the second arm to selectively prevent rotation of the second arm relative to the first arm;
 a valve turning machine coupled to the second end of the second arm, wherein the valve turning machine includes a motor and a handle;
 wherein the first brake is a first hydraulic brake and the second brake is a second hydraulic brake; and
 a hydraulic pump and a valve, wherein the hydraulic pump is in fluid communication with the first and second hydraulic brakes and the valve is positioned between the hydraulic pump and at least one of the first hydraulic brake and the second hydraulic brake to selectively direct hydraulic fluid from the hydraulic pump to the at least one of the first hydraulic brake and the second hydraulic brake.

16. The valve operating device of claim 15, wherein the first arm and the second arm are hollow and tubular along at least a portion thereof.

17. The valve operating device of claim 16, wherein the first arm and the second arm are rectangular in cross-section.

18. The valve operating device of claim 15, wherein the motor of the valve turning machine is a hydraulic motor.

19. The valve operating device of claim 15, further comprising an electronic controller detachable from the valve turning machine and in communication with the valve turning machine.

20. The valve operating device of claim 19, wherein the electronic controller is in communication with the valve turning machine through a wire.

21. The valve operating device of claim 19, wherein the electronic controller is in wireless communication with the valve turning machine.

22. The valve operating device of claim 19, wherein the electronic controller includes a microprocessor and memory, wherein the memory is configured to store information pertaining to operation of the valve operating device.

23. The valve operating device of claim 15, wherein the handle is positioned at an outer end of the valve turning machine.

24. The valve operating device of claim 15, wherein the second bearing includes an inner race and an outer race, wherein the inner race of the second bearing is tightly fitted around the second pedestal and the outer race is rigidly retained near the second end of the first arm.

25. The valve operating device of claim 15, wherein the mounting includes a mounting plate.

26. The valve operating device of claim 15, wherein the valve turning machine further includes a control configured to operate at least one of the first brake and the second brake.

27. The valve operating device of claim 26, wherein the handle and the control are remote from the first and second brakes.

28. A valve operating device comprising:
a mounting;
a first pedestal extending vertically from the mounting, wherein the first pedestal defines a first vertical pivot axis;
a first arm having a first end and a second end, wherein the first arm is pivotally coupled to the first pedestal at the first end of the first arm, and wherein the first arm is configured to rotate about the first vertical pivot axis and is generally perpendicular to the first vertical pivot axis;
a first bearing coupled to the first pedestal and the first end of the first arm to facilitate pivoting of the first arm relative to the mounting;
a first brake positioned at the first pedestal and coupled to the first end of the first arm to selectively prevent rotation of the first arm relative to the mounting;
a second pedestal defining a second vertical pivot axis and positioned at the second end of the first arm;
a second arm having a first end and a second end, wherein the second arm is pivotally coupled to the second pedestal at the first end of the second arm, wherein the second arm is hollow along at least a portion of the second arm, and wherein the second arm is configured to rotate about the second vertical axis;
a second bearing coupled to the second pedestal and the first end of the second arm to facilitate pivoting of the second arm relative to the first arm;
a second brake positioned at the second pedestal and coupled to the first end of the second arm to selectively prevent rotation of the second arm relative to the first arm;

a valve turning machine coupled to the second end of the second arm, wherein the valve turning machine includes a hydraulic motor and a handle;
a hydraulic pump in fluid communication with the hydraulic motor; and
at least one valve positioned between the hydraulic pump and the hydraulic motor, wherein the at least one valve is configured to selectively direct hydraulic fluid from the hydraulic pump through at least one hose to operate the hydraulic motor;
wherein the first bearing includes an inner race and an outer race, wherein the inner race is tightly fitted around the first pedestal and the outer race is rigidly retained at the first end of the first arm.

29. The valve operating device of claim 28, wherein the first arm and the second arm are rectangular in cross-section.

30. The valve operating device of claim 28, further comprising an electronic controller detachable from the valve turning machine and in communication with the valve turning machine.

31. The valve operating device of claim 30, wherein the electronic controller is in communication with the valve turning machine through a wire.

32. The valve operating device of claim 30, wherein the electronic controller is in wireless communication with the valve turning machine.

33. The valve operating device of claim 30, wherein the electronic controller includes a microprocessor and memory, wherein the memory is configured to store information pertaining to operation of the valve operating device.

34. The valve operating device of claim 28, wherein the handle is positioned at an outer end of the valve turning machine.

35. The valve operating device of claim 28, wherein the second bearing includes an inner race and an outer race, wherein the inner race of the second bearing is tightly fitted around the second pedestal and the outer race is rigidly retained near the second end of the first arm.

36. The valve operating device of claim 28, wherein the second arm is tubular along at least a portion of the second arm.

37. The valve operating device of claim 36, wherein the tubular portion of the second arm is rectangular in cross-section.

38. The valve operating device of claim 28, wherein the valve turning machine further includes a control configured to operate at least one of the first brake and the second brake.

39. The valve operating device of claim 38, wherein the handle and the control are remote from the first and second brakes.

40. A valve operating device comprising:
a mounting;
a first pedestal extending vertically from the mounting, wherein the first pedestal defines a first vertical pivot axis;
a first arm having a first end and a second end, wherein the first arm is pivotally coupled to the first pedestal at the first end of the first arm, and wherein the first arm is configured to rotate about the first vertical pivot axis and is generally perpendicular to the first vertical pivot axis;
a first bearing coupled to the first pedestal and the first end of the first arm to facilitate pivoting of the first arm relative to the mounting;
a first brake positioned at the first pedestal and coupled to the first end of the first arm to selectively prevent rotation of the first arm relative to the mounting;

a second pedestal defining a second vertical pivot axis and positioned at the second end of the first arm;

a second arm having a first end and a second end, wherein the second arm is pivotally coupled to the second pedestal at the first end of the second arm, wherein the second arm is hollow along at least a portion of the second arm, and wherein the second arm is configured to rotate about the second vertical axis;

a second bearing coupled to the second pedestal and the first end of the second arm to facilitate pivoting of the second arm relative to the first arm;

a second brake positioned at the second pedestal and coupled to the first end of the second arm to selectively prevent rotation of the second arm relative to the first arm;

a valve turning machine coupled to the second end of the second arm, wherein the valve turning machine includes a hydraulic motor and a handle;

a hydraulic pump in fluid communication with the hydraulic motor; and at least one valve positioned between the hydraulic pump and the hydraulic motor, wherein the at least one valve is configured to selectively direct hydraulic fluid from the hydraulic pump through at least one hose to operate the hydraulic motor;

wherein the first brake is a first hydraulic brake and the second brake is a second hydraulic brake; and wherein the hydraulic pump is in fluid communication with the first and second hydraulic brakes to selectively direct hydraulic fluid to the first and second hydraulic brakes.

41. The valve operating device of claim 40, wherein the first arm and the second arm are rectangular in cross-section.

42. The valve operating device of claim 40, further comprising an electronic controller detachable from the valve turning machine and in communication with the valve turning machine.

43. The valve operating device of claim 42, wherein the electronic controller is in communication with the valve turning machine through a wire.

44. The valve operating device of claim 42, wherein the electronic controller is in wireless communication with the valve turning machine.

45. The valve operating device of claim 42, wherein the electronic controller includes a microprocessor and memory, wherein the memory is configured to store information pertaining to operation of the valve operating device.

46. The valve operating device of claim 40, wherein the handle is positioned at an outer end of the valve turning machine.

47. The valve operating device of claim 46, wherein the second bearing includes an inner race and an outer race, wherein the inner race of the second bearing is tightly fitted around the second pedestal and the outer race is rigidly retained near the second end of the first arm.

48. The valve operating device of claim 40, wherein the second arm is tubular along at least a portion of the second arm.

49. The valve operating device of claim 48, wherein the tubular portion of the second arm is rectangular in cross-section.

50. The valve operating device of claim 40, wherein the valve turning machine further includes a control configured to operate at least one of the first brake and the second brake.

51. The valve operating device of claim 50, wherein the handle and the control are remote from the first and second brakes.

* * * * *